United States Patent [19]

Inagaki et al.

[11] Patent Number: 4,777,202

[45] Date of Patent: Oct. 11, 1988

[54] FLAME-RETARDANT STYRENE RESIN COMPOSITION

[75] Inventors: Teruo Inagaki, Yokkaichi; Seiichi Atomori, Kuwana; Tateki Furuyama, Yokkaichi; Yuji Yamamoto, Suzuka, all of Japan

[73] Assignee: Japan Synthetic Rubber Co., Ltd., Tokyo, Japan

[21] Appl. No.: 53,639

[22] Filed: May 26, 1987

[30] Foreign Application Priority Data

Jun. 4, 1986 [JP] Japan .................. 61-129946

[51] Int. Cl.$^4$ .............................................. C08K 5/06
[52] U.S. Cl. ................................... 524/281; 524/371
[58] Field of Search .............. 524/281, 412, 466, 371; 521/146; 528/196, 198, 202, 204; 558/268; 525/147, 67

[56] References Cited

U.S. PATENT DOCUMENTS

| | | | |
|---|---|---|---|
| 3,846,469 | 11/1974 | Gunsher | 524/281 |
| 3,855,277 | 12/1974 | Fox | 524/410 |
| 4,239,678 | 12/1980 | Williams | 524/159 |
| 4,269,964 | 5/1981 | Freitag et al. | 528/204 |
| 4,707,510 | 11/1987 | Imai et al. | 524/281 |

FOREIGN PATENT DOCUMENTS

| | | |
|---|---|---|
| 0156219 | 10/1985 | European Pat. Off. |
| 58-65741 | 4/1983 | Japan . |
| 60-208343 | 10/1985 | Japan . |

OTHER PUBLICATIONS

Gibson, Harry W. et al.–"Synthesis and Thermal Characterization of Some Novel Phenol Carbonates", J. Polymer Sci.: Polymer Chemistry Edition, vol. 17, No. 8, 2499–2509 (Aug. 1979).

Patent Abstracts of Japan, vol. 10, No. 67 (C-333)[2124], Mar. 15, 1986.

Primary Examiner—Veronica P. Hoke
Attorney, Agent, or Firm—Oblon, Fisher, Spivak, McClelland & Maier

[57] ABSTRACT

A flame-retardant styrene resin composition comprising 100 parts by weight of a styrene resin, 1 to 25 parts by weight of at least one flame retarder (A) represented by the formula (I):

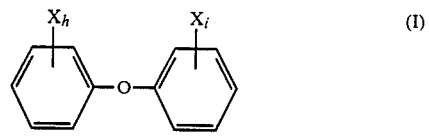

wherein X is Br or Cl; and each of h and i is an integer of 2 to 5, and 1 to 25 parts by weight of at least one flame retarder (B) represented by the formula (II):

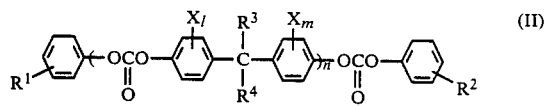

wherein X is Br or Cl; each of l and m is an integer of 1 to 4; n means that the number of repeating units is 1 to 50; each of $R^1$ and $R^2$ is a $C_{1-12}$ alkyl group; and each of $R^3$ and $R^4$ is a hydrogen atom, a lower alkyl group, an alkylphenyl group or a phenyl group, the total amount of (A) and (B) being 2 to 40 parts by weight. This composition has excellent heat resistance and excellent heat stability in addition to flame retardancy.

17 Claims, No Drawings

FLAME-RETARDANT STYRENE RESIN COMPOSITION

This invention relates to a flame-retardant styrene resin composition having excellent heat resistance and excellent heat stability as compared with conventional flame-retardant styrene resin compositions.

Polystyrene resins, representatives of which are polystyrenes, acrylonitrile-styrene copolymer resins and ABS resins, have excellent mechanical properties, excellent electrical insulation, excellent moldability and fine appearance when molded, so that they are used in large amounts in automotive parts, components for electrical equipment and appliances, construction materials, etc. They are also in wide use in other molded products. Accordingly, their consumption is increasing year by year.

However, polystyrene resins are flammable. Therefore, depending upon their applications, they are subjected to various mandatory controls on their flammability for the safety reason and are required to have high flame retardancy. This applies also to polystyrene resins used in office automation equipment which has been in wide use in recent years, and polystyrene resins used in this application are required to have not only flame retardancy but also heat resistance to such an extent that they cause no deformation even when exposed for a long time to the heat generated in the electric live parts of the mainbody of said equipment.

Conventionally, polystyrene resins can have relatively high flame retardancy by incorporating into them an organic halogen compound as a flame retarder and antimony trioxide as a flame-retarding aid. Said resins can further have heat resistance by incorporating into them a flame retarder, namely, (1) a halogenated diphenyl ether of a high melting point, a representative of which is decabromodiphenyl ether or (2) a halogenated bisphenol type polycarbonate oligomer. These flame retarders can impart good heat resistance to polystyrene resins. However, the flame retarder (1) has a very high melting point of about 307° C. and the flame retarder (2) has a very poor compatibility with polystyrene resins; therefore, both of these flame retarders have a poor dispersibility in the resins, resulting in a reduction in mechanical strengths and appearance of molded product.

In order to solve the above problem, it is proposed in Japanese Patent Application Kokai (Laid-Open) Nos. 65,741/83 and 208,343/85 to incorporate, into a polystyrene resin, a halogenated diphenyl ether and a halogenated bisphenol type polycarbonate oligomer both as a flame retarder and antimony trioxide as a flame-retarding aid, in specific proportions.

However when flame-retardant polystyrene resins prepared according to the above procedures are subjected to, for example, kneading in an extruder and molding by an injection machine, decomposition of flame retarders per se is mainly caused owing to heat history in the moltn state, whereby degradation in appearance such as discoloration or the like, of the molded product is caused, and further, reduced mechanical strengths and reduced heat resistance are often caused. Hence, said flame-retardant polystyrene resins are not satisfactory in heat stability during molding.

An object of this invention is to provide a flame-retardant styrene resin composition having excellent heat stability during molding, excellent heat resistance and excellent mechanical properties.

Other objects and advantages of this invention will become apparent from the following description.

According to this invention, there is provided a flame-retardant styrene resin composition comprising 100 parts by weight of a styrene resin, 1 to 25 parts by weight of at least one flame retarder (A) represented by the formula (I):

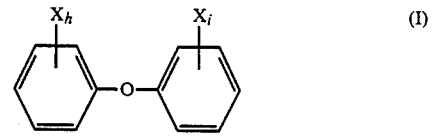

wherein X is Br or Cl, preferably Br; and each of h and i is an integer of 2 to 5, preferably 3 to 5 in view of thermal resistance and dispersibility, and 1 to 25 parts by weight of at least one flame retarder (B) represented by the formula (II):

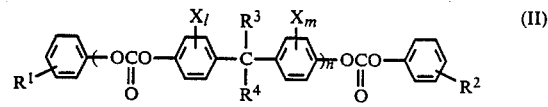

wherein X is Br or Cl, preferably Br; each of l and m is an integer of 1 to 4, preferably 2 to 3, more preferably 2; n means that the number of repeating units is 1 to 50, preferably 1 to 10, more preferably 2 to 5 from the standpoint of improved impact resistance and fluidity; each of $R^1$ and $R^2$ is a $C_{1-12}$ alkyl group, preferably a $C_{2-6}$ alkyl group; and each of $R^3$ and $R^4$ is a hydrogen atom, a lower alkyl group, an alkylphenyl group or a phenyl group, preferably a lower alkyl group, the total amount of (A) and (B) being 2 to 40 parts by weight.

The styrene resin used in this invention includes styrene resins obtained by reacting an aromatic alkenyl compound (a primary component) such as styrene, an alpha-substituted styrene (e.g. alpha-methylstryene), a nucleus-substituted styrene (e.g. vinyltoluene, o-chlorostyrene) or the like with or without at least one copolymerizable monomer, for example, an alkenyl compound such as acrylonitrile, acrylic acid, methacrylic acid, methyl or ethyl acrylate or methacrylate or the like. The styrene resin also includes rubber-modified styrene resins obtained by reacting at least one monomer selected from the above-mentioned monomers in the presence of a rubbery substance such as a polybutadiene, a butadiene-styrene copolymer rubber, an acrylonitrile-butadiene copolymer rubber, an acrylic rubber, an ethylene-propylene-diene copolymer rubber or the like. Specifically, the styrene resin includes a polystyrene, a styrene-acrylonitrile copolymer, a styrene-methyl methacrylate copolymer, an ABS resin, an AES resin (resin obtained by graft-copolymerizing styrene and acrylonitrile in the presence of an ethylene-propylene copolymer rubber) and an AAS resin (resin obtained by graft-copolymerizing styrene and acrylonitrile in the presene of an acrylic rubber).

The production of the styrene resin can be conducted in accordance with any of suspension polymerization, bulk polymerization, emulsion polymerization and bulk-suspension polymerization.

The flame retarder (A) used in this invention is a compound represented by the formula (I) and specifically includes pentabromodiphenyl ether, hexabromodiphenyl ether, octabromodiphenyl ether, decabromodiphenyl ether, etc. Decabromodiphenyl ether is preferred in order to obtain high heat resistance, and octabromodiphenyl ether is preferred in order to obtain improved dispersibility. Co-use of decabromodiphenyl ether and octabromodiphenyl ether is particularly preferred.

The amount of the flame retarder (A) used is 1 to 25 parts by weight, preferably 5 to 20 parts by weight per 100 parts by weight of the styrene resin. When the amount is less than 1 part by weight, the resulting composition has no sufficient flame retardancy. When the amount exceeds 25 parts by weight, poor dispersion results and no sufficient mechanical strength is obtained.

The flame retarder (B) used in this invention is a compound represented by the formula (II) and can be produced according to, for example, an ordinary method of reacting a halogenated bisphenol compound with phosgene. In this case, an end-blocking agent such as a p-alkylphenol is used. In the formula (II), Br is preferred to Cl as the X. Incidentally, a compound of the formula (II) wherein X is Br may be used in combination with a small amount of a compound of the formula (II) wherein X is Cl.

The amount of the flame retarder (B) used is 1 to 25 parts by weight, preferably 5 to 20 parts by weight, more preferably 5 to 15 parts by weight, per 100 parts by weight of the styrene resin. When the amount is less than 1 part by weight, the intended synergistic effect due to combination with the flame retarder (A) cannot be obtained. When the amount exceeds 25 parts by weight, the mechanical properties are deteriorated.

The total amount of the flame retarder (A) and the flame retarder (B) is required to be 2 to 40 parts by weight, preferably 5 to 40 parts by weight, more preferably 7 to 35 parts by weight, particularly preferably 10 to 25 parts by weight, per 100 parts by weight of the styrene resin. When the total amount is less than 2 parts by weight, the resulting composition has no sufficient flame retardancy. When it is more than 40 parts by weight, the mechanical properties of the composition is deteriorated.

The weight ratio of (A)/(B) is preferably 90-20/10-80, more preferably 80-25/20-75, because a composition having an excellent appearance when molded and an excellent heat stability during melt moding is obtained.

In addition to the flame retarders (A) and (B), other conventional flame retarders may, if desired, be added, and also, a flame-retarding aid showing synergistic flame retardancy may be added to obtain a better flame-retardancy, whereby the amount of said flame retarders used may be reduced. Specific examples of the flame-retarding aid are antimony trioxide, antimony pentaoxide, stannic oxide, iron oxide, zinc oxide, zirconium oxide, zinc borate, aluminum hydroxide and ammonium polyphosphate. Of these, antimony trioxide is particularly preferred.

The amount of the above flame-retarding aid used is 0 to 10 parts by weight, preferably 2 to 8 parts by weight, per 100 parts by weight of the styrene resin. Use of an amount exceeding 10 parts by weight results in a reduction in mechanical strength of the composition of this invention.

Incorporation of a halogenated thermoplastic resin such as a halogenated polyolefin, a halogenated polystyrene or the like into the composition of this invention enables the composition to have a further improved flame retardancy. Of these halogenated thermoplastic resins, a halogenated polyolefin, particularly a chlorinated polyethylene is preferred in view of the prevention of melt dripping.

The amount of the halogenated thermoplastic resin used is 0 to 10 parts by weight, preferably 0.5 to 8 parts by weight, more preferably 0.7 to 5 parts by weight, per 100 parts by weight of the styrene resin.

The flame-retardant styrene resin composition of this invention may further contain a small amount of a stabilizer such as a phosphite, an epoxy compound or an organotin compound to further improve its heat stability during molding, and may also contain a small amount of a lubricant such as a hydrogenated hardened castor oil, a low-molecular weight polyethyene or a silicone oil to improve its moldability.

Furthermore, the composition of this invention may contain known additives such as a dye, a pigment, an ultraviolet absorber, a foaming agent, an inorganic filler and the like.

The composition of this invention can be produced without requiring any special apparatus, by mixing it in a Henschel mixer, a tumbler or the like which is usually often used, or by melt-mixing it by means of a hot roll, an extruder, a Banbury mixer or the like.

In recent years, molded products of flame-retardant styrene resins have been required to have a larger size, a more intricate shape and finer appearance, in order to meet the increasing diversification of their applications.

Production of a molded product of a larger size or a more intricate shape requires a low melt viscosity during molding. In order to solve this problem, an attempt is generally made to increase the molding temperature. However, the molding temperature of flame-retardant styrene resins has a limitation because they have a poor heat stability. Thus, it is a big obstacle for obtaining molded products of flame-retardant styrene resins having a large size and/or an intricate shape.

On the other hand, the flame-retardant styrene resin composition of this invention containing the flame retarders (A) and (B) in combination, as compared with flame-retardant styrene resin compositions containing the flame retarder (A) or (B) alone, has an improved heat stability and an improved appearance when molded. Moreover, the addition of the flame retarders (A) and (B) in smaller amounts shows the same flame retardancy and excellent heat restanece and excellent impact strength.

As a result, the composition of this invention enables production of molded products of a large size and an intricate shape and can reduce the molding time, whereby the productivity of molding is increased substantially. Thus, the flame-retardant styrene resin composition of this invention has a very high industrial value.

This invention is explained below referring to Examples, which are not by way of limitation but by way of illustration.

Physical properties and heat stability were tested and evaluated according to the following methods:
(1) Burning property
  UL 94
  Test pieces: $\frac{1}{8}'' \times \frac{1}{2}'' \times 5''$ and $1/16'' \times \frac{1}{2}'' \times 5''$
(2) Izod impact strength
  ASTM D 256
  Test piece: $\frac{1}{2}'' \times \frac{1}{4}'' \times 5/2''$ (notched)

(3) Heat resistance (heat distortion temperature)
ASTM D 648
Test piece: ½"×½"×5"
Load: 18.6 kg/cm²

(4) Appearance and heat stability of molded product
Molding was conducted at a predetermined temperature using an injection machine of 5 oz in capacity. The resulting molded product was observed in respect of appearance and scorch.

Evaluation of appearance

○ Surface is smooth and has good gloss.
X Surface is sharkskin-like and has poor gloss.

Evaluation of heat stability

◎ Excellent.
○ Good.
△ Not scorched but greatly yellowed.
X Scorched.

In the Examples and the Comparative Examples, parts and % are by weight, unless otherwise specified.

EXAMPLES 1 TO 14 AND COMPARATIVE EXAMPLES 1 TO 10

Into 100 parts by weight of an acrylonitrile-butadiene-styrene copolymer resin (JSR ABS 15 (graft copolymer consisting of 12% by weight of polybutadiene rubber, 24% by weight of acrylonitrile and 64% by weight of styrene), manufactured by Japan Synthetic Rubber Co., Ltd.) were incorporated compounds having the following structural formulas (A-1) and (A-2) as a flame retarder (A), a conventional compound having the following structural formula (a) for comparison with the flame retarder (A), a compound having the following structural formula (B) as a flame retarder (B), compounds having the following structural formulas (b) and (c) for comparison with the flame retarder (B), and antimony trioxide, in the proportions shown in Table 1. To each of the resulting compositions were added 0.5 part of dibutyltin maleate as a stabilizer and 0.5 part of a hydrogenation-hardened castor oil and 0.05 part of a silicne oil each as a lubricant. Each of the resulting mixtures was subjected to Henschel mixer and then melt-kneaded at 220° C. in a 50 mmφ-vent extruder and pelletized.

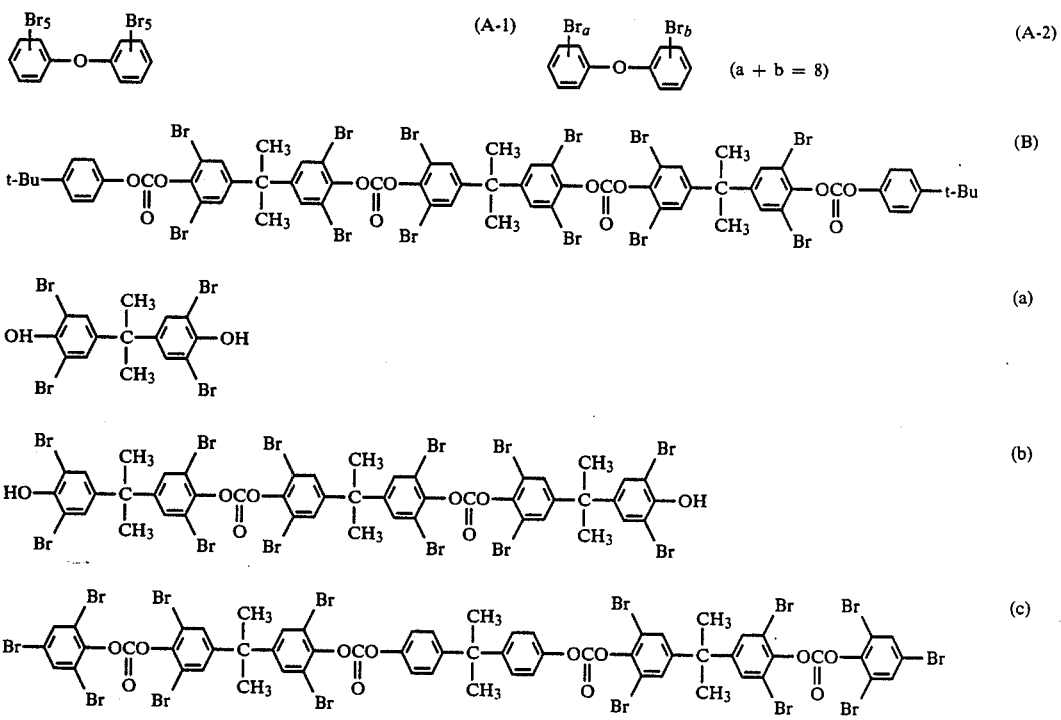

The pellets were tested for physical properties and heat stability. The results are shown in Table 1.

EXAMPLE 15

The same procedure as in Example 3 was repeated, except that

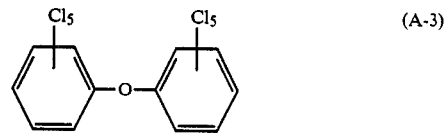

was substituted for the (A-1), whereby the results shown in Table 1 were obtained.

EXAMPLE 16

The same procedure as in Example 12 was repeated, except that

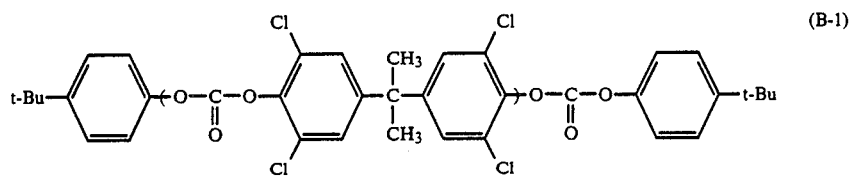

was substituted for the (B), to obtain the results shown in Table 1.

EXAMPLE 17

The same procedure as in Example 12 was repeated, except that

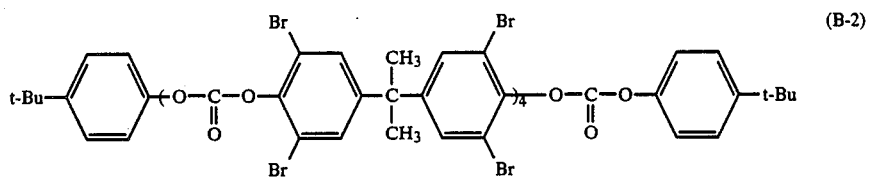

was substituted for the (B), to obtain the results shown in Table 1.

EXAMPLE 18

The same procedure as in Example 12 was repeated, except that

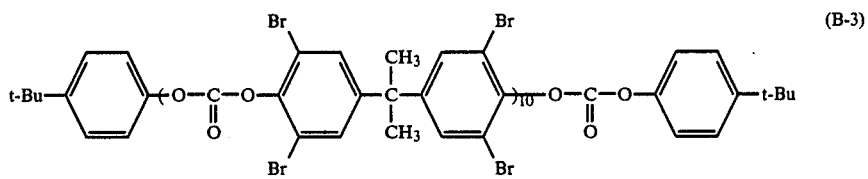

was substituted for the (B), to obtain the results shown in Table 1.

EXAMPLE 19

The same procedure as in Example 12 was repeated, except that

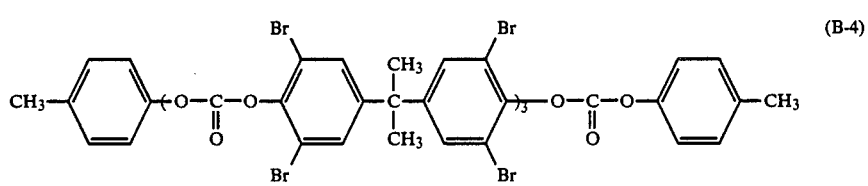

was substituted for the (B), to obtain the results shown in Table 1.

EXAMPLE 20

The same procedure as in Example 12 was repeated, except that

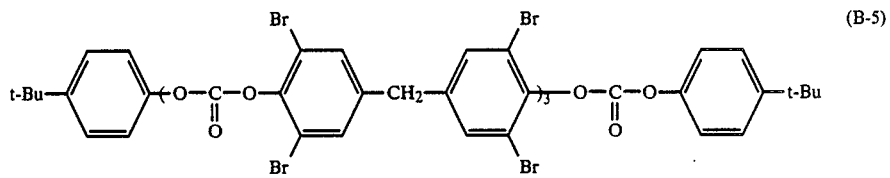

was substituted for the (B), to obtain the results shown in Table 1.

EXAMPLE 21

The same procedure as in Example 12 was repeated, except that 3 parts by weight of a chlorinated polyethylene (Cl-PE) was further used as a flame retarder, to obtain the results shown in Table 1.

EXAMPLE 22

The same procedure as in Example 21 was repeated, except that the amount of $Sb_2O_3$ was decreased to 4 parts by weight, to obtain the results shown in Table 1.

TABLE

| | (A-1) | (A-2) | (B) Type | (B) Amount | (a) | (b) | (c) | Sb₂O₃ | UL 94 ⅛" | UL 94 1/16" | Izod impact kg·cm/cm² | HDT (°C.) | 230°C. | 240°C. | 250°C. | 260°C. | 270°C. | Appearance (230°C.) |
|---|---|---|---|---|---|---|---|---|---|---|---|---|---|---|---|---|---|---|
| Example | | | | | | | | | | | | | | | | | | |
| 1 | 5 | 0 | B | 5 | 0 | 0 | 0 | 0 | V-2 | V-2 | 18 | 90 | ⊚ | ⊚ | ⊚ | ⊚ | ○ | ○ |
| 2 | 5 | 0 | B | 5 | 0 | 0 | 0 | 5 | V-1 | V-2 | 15 | 90 | ⊚ | ⊚ | ⊚ | ⊚ | ○ | ○ |
| 3 | 5 | 0 | B | 5 | 0 | 0 | 0 | 8 | V-1 | V-2 | 15 | 90 | ⊚ | ⊚ | ⊚ | ⊚ | ○ | ○ |
| 4 | 5 | 0 | B | 12 | 0 | 0 | 0 | 0 | V-0 | V-2 | 17 | 92 | ⊚ | ⊚ | ⊚ | ⊚ | ○ | ○ |
| 5 | 5 | 0 | B | 12 | 0 | 0 | 0 | 5 | V-0 | V-0 | 15 | 92 | ⊚ | ⊚ | ⊚ | ⊚ | ○ | ○ |
| 6 | 10 | 0 | B | 12 | 0 | 0 | 0 | 0 | V-0 | V-0 | 16 | 95 | ⊚ | ⊚ | ⊚ | ⊚ | ○ | ○ |
| 7 | 10 | 0 | B | 12 | 0 | 0 | 0 | 2.5 | V-0 | V-0 | 16 | 95 | ⊚ | ⊚ | ⊚ | ⊚ | ○ | ○ |
| 8 | 10 | 0 | B | 12 | 0 | 0 | 0 | 5 | V-0 | V-0 | 15 | 94 | ⊚ | ⊚ | ⊚ | ⊚ | ○ | ○ |
| 9 | 10 | 0 | B | 12 | 0 | 0 | 0 | 8 | V-0 | V-0 | 14 | 94 | ⊚ | ⊚ | ⊚ | ⊚ | ○ | ○ |
| 10 | 15 | 5 | B | 5 | 0 | 0 | 0 | 0 | V-0 | V-2 | 16 | 92 | ⊚ | ⊚ | ⊚ | ⊚ | ○ | ○ |
| 11 | 15 | 5 | B | 5 | 0 | 0 | 0 | 5 | V-0 | V-0 | 15 | 92 | ⊚ | ⊚ | ⊚ | ⊚ | ○ | ○ |
| 12 | 5 | 5 | B | 5 | 0 | 0 | 0 | 8 | V-0 | V-2 | 14 | 90 | ⊚ | ⊚ | ⊚ | ⊚ | ○ | ○ |
| 13 | 0 | 5 | B | 15 | 0 | 0 | 0 | 0 | V-0 | V-0 | 14 | 91 | ⊚ | ⊚ | ⊚ | ⊚ | ○ | ○ |
| 14 | 0 | 5 | B | 15 | 0 | 0 | 0 | 5 | V-0 | V-0 | 13 | 91 | ⊚ | ⊚ | ⊚ | ⊚ | ○ | ○ |
| 15 | 0 | (A-3) 5 | B | 5 | 0 | 0 | 0 | 8 | V-1 | V-2 | 15 | 90 | ⊚ | ⊚ | ⊚ | ⊚ | ○ | ○ |
| 16 | 5 | 5 | B-1 | 5 | 0 | 0 | 0 | 8 | V-2 | V-2 | 14 | 90 | ⊚ | ⊚ | ⊚ | ⊚ | ○ | ○ |
| 17 | 5 | 5 | B-2 | 5 | 0 | 0 | 0 | 8 | V-0 | V-0 | 14 | 91 | ⊚ | ⊚ | ⊚ | ○ | ○ | ○ |
| 18 | 5 | 5 | B-3 | 5 | 0 | 0 | 0 | 8 | V-0 | V-0 | 10 | 94 | ⊚ | ⊚ | ⊚ | ⊚ | ○ | ○ |
| 19 | 5 | 5 | B-4 | 5 | 0 | 0 | 0 | 8 | V-0 | V-0 | 15 | 90 | ⊚ | ⊚ | ○ | ○ | ○ | ○ |
| 20 | 5 | 5 | B-5 | 5 | 0 | 0 | 0 | 8 | V-0 | V-0 | 17 | 89 | ⊚ | ⊚ | ⊚ | ○ | ○ | ○ |
| 21 | 5 | 5 | B | 5 | 0 | 0 | (Cl-PE) 3 | 8 | V-0 | V-0 | 15 | 90 | ⊚ | ⊚ | ⊚ | ⊚ | ○ | ○ |
| 22 | 5 | 5 | B | 5 | 0 | 0 | (Cl-PE) 3 | 4 | V-0 | V-0 | 17 | 90 | ⊚ | ⊚ | ⊚ | ⊚ | △ | ○ |
| Comparative Example | | | | | | | | | | | | | | | | | | |
| 1 | 0 | 0 | — | 0 | 0 | 0 | 0 | 0 | HB | HB | 20 | 89 | ⊚ | ⊚ | ⊚ | ⊚ | ⊚ | ○ |
| 2 | 22 | 0 | — | 0 | 0 | 0 | 0 | 8 | V-0 | V-2 | 6 | 91 | ⊚ | ⊚ | ○ | ○ | △ | × |
| 3 | 0 | 22 | B | 0 | 0 | 0 | 0 | 8 | V-1 | V-2 | 10 | 82 | ⊚ | × | ⊚ | △ | × | ○ |
| 4 | 0 | 0 | — | 22 | 0 | 0 | 0 | 8 | V-1 | HB | 6 | 94 | △ | × | × | × | ○ | × |
| 5 | 0 | 0 | — | 0 | 22 | 0 | 0 | 8 | V-1 | V-0 | 14 | 75 | ⊚ | ⊚ | ⊚ | △ | × | ○ |
| 6 | 0 | 0 | — | 0 | 0 | 22 | 0 | 8 | V-1 | V-2 | 5 | 95 | ⊚ | ○ | × | △ | × | × |
| 7 | 5 | 0 | B | 5 | 0 | 0 | 22 | 8 | V-0 | HB | 15 | 94 | ○ | △ | ⊚ | △ | × | ○ |
| 8 | 5 | 0 | — | 0 | 0 | 12 | 0 | 8 | V-0 | V-0 | 14 | 89 | ⊚ | ⊚ | × | × | × | ○ |
| 9 | 10 | 0 | B | 0 | 0 | 12 | 0 | 8 | V-0 | V-0 | 16 | 93 | ⊚ | ⊚ | ⊚ | △ | × | ○ |
| 10 | 10 | 0 | — | 0 | 0 | 12 | 0 | 8 | V-0 | V-0 | 16 | 93 | ⊚ | ⊚ | ⊚ | △ | × | ○ |

Note:
HB refers to horizontal burning.

The results of Examples are compared with those of Comparative Examples. Comparative Example 8 is a case where part of the flame retarder (A) was replaced by a small amount of a flame retarder conventionally used to render the styrene resin flame-retardant. The composition has an excellent balance of impact resistance and heat resistance but a very poor heat stability. Comparative Examples 9 and 10 are cases of known improved flame-retardant styrene resins. These resins have an insufficient heat stability at high temperatures. On the other hand, the flame-retardant styrene resins of this invention have a very excellent heat stability at 260° C. and 270° C. as compared with those of Comparative Examples 9 and 10.

Thus, the flame-retardant styrene resin composition of this invention containing the flame retarders (A) and (B) in combination, as compared with flame-resistant styrene resin compositions containing the flame retarder (A) or (B) alone, has an improved heat stability and an improved appearance when molded, and the same time, the addition of a small amount of the flame retarders (A) and (B) brings about the same flame retardancy. In addition, the composition has an excellent heat resistance and an excellent impact strength.

According to this invention, there can be obtained a flame-retardant styrene resin which has a surprisingly improved heat stability during molding, satisfies the required flame retardancy and heat resistance and has excellent mechanical properties.

Further surprisingly, the resin of this invention has solved the drawbacks experienced when the flame retarder (A) or (B) is used alone, and can give a molded product of fine appearance over a wide range of molding temperatures.

The drawbacks encountered by using the flame retarder (A) alone are as follows: Since the flame retarder (A) has a high melting point, it remains unmelted in a molding temperature range for conventional styrene resins, causes poor dispersion during kneading by molding machine and, when mixing is incomplete, it follows that air is taken into the composition. Consequently, the molded product has a poor surface gloss and, when it is colored with a pigment, has uneven color and silver streaks.

Use of a higher molding temperature can improve the problems caused by poor dispersion but cause the thermal decomposition of flame retarder itself, and the molded product is greatly yellowed.

The drawbacks resulting from the use of the flame retarder (B) alone are as follows: Since the flame retarder (B) is inferior in compatibility with styrene resins, its dispersibility due to the compatibility becomes poor with an increase of the amount of the flame retardar (B) added, resulting in significant reduction in gloss of molded product.

The flame-retardant styrene resin composition of this invention has solved these drawbacks. The reasons are that owing to the combined use of the flame retarders (A) and (B), the high melting point of the flame retarder (A) and the low compatibility of the flame retarder (B) with styrene resins are compensated by both the flame retarders, and the two flame retarders act synergistically.

What is claimed is:

1. A flame-retardant styrene resin composition comprising 100 parts by weight of a styrene resin, 1 to 25 parts by weight of at least one flame retarder (A) represented by the formula (I):

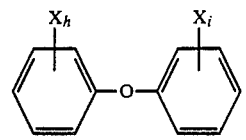

wherein X is Br or Cl; and each of h and i is an integer of 2 to 5, and 1 to 25 parts by weight of at least one flame retarder (B) represented by the formula (II):

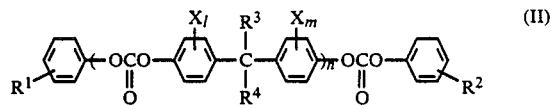

wherein X is Br or Cl; each of l and m is an integer of 1 to 4; n means that the number of repeating units is 1 to 50; each of $R^1$ and $R^2$ is a $C_{1-12}$alkyl group; and each of $R^3$ and $R^4$ is a hydrogen atom, a lower alkyl group, an alkylphenyl group or a phenyl group, the total amount of (A) and (B) being 2 to 40 parts by weight.

2. A flame-retardant styrene resin composition according to claim 1, wherein the flame retarder (A) is a compound represented by the formula (I) wherein X is Br.

3. A flame-retardant styrene resin composition according to claim 1, wherein the flame retarder (A) is a compound represented by the formula (I) wherein each of h and i is an integer of 3 to 5.

4. A flame-retardant styrene resin composition according to claim 1, wherein the flame retarder (B) is a compound represented by the formula (II) wherein X is Br.

5. A flame-retardant styrene resin composition according to claim 1, wherein the flame retarder (B) is a compound represented by the formula (II) wherein each of l and m is an integer of 2 to 3.

6. A flame-retardant styrene resin composition according to claim 1, wherein the flame retarder (B) is a compound represented by the formula (II) wherein n is an integer of 2 to 5.

7. A flame-retardant styrene resin composition according to claim 1, wherein the flame retarder (B) is a compound represented by the formula (II) wherein each of $R^1$ and $R^2$ is a $C_{2-6}$alkyl group.

8. A flame-retardant styrene resin composition according to claim 1, wherein the amount of the flame retarder (A) used is 5 to 20 parts by weight and the amount of the flame retarder (B) used is 5 to 20 parts by weight.

9. A flame-retardant styrene resin composition according to claim 1, wherein the total amount of the flame retarder (A) and the flame retarder (B) used is 5 to 35 parts by weight.

10. A flame-retardant styrene resin composition according to claim 1, wherein the total amount of the flame retarder (A) and the flame retarder (B) used is 10 to 25 parts by weight.

11. A flame-retardant styrene resin composition according to claim 1, wherein the weight ratio of the flame retarder (A) to the flame retarder (B) is 20-90/80-10.

12. A flame-retardant styrene resin composition according to claim 1, wherein the weight ratio of the flame retarder (A) to the flame retarder (B) is 25-80/75-20.

13. A flame-retardant styrene resin composition according to claim 1, wherein the flame retarder (A) is at least one member selected from the group consisting of pentabromodiphenyl ether, hexabromodiphenyl ether, octabromodiphenyl ether and decabromodiphenyl ether.

14. A flame-retardant styrene resin composition according to claim 1, wherein the styrene resin is at least one member selected from the group consisting of polymers of aromatic alkenyl compounds; copolymers of an aromatic alkenyl compound and other copolymerizable monomers; polymers obtained by polymerizing an aromatic alkenyl compound in the presence of a rubbery polymer; and copolymers obtained by copolymerizing an aromatic alkenyl compound and other copolymerizable monomers in the presence of a rubbery polymer.

15. A flame-retardant styrene resin composition according to claim 1, wherein the styrene resin is at least one resin selected from the group consisting of polystyrene, styrene-acrylonitrile copolymer, styrene-methyl methacrylate copolymer, an ABS resin, an AES resin and an AAS resin.

16. A flame-retardant styrene resin composition according to claim 1, which further comprises at least one flame-retarding aid selected from the group consisting of antimony trioxide, antimony pentoxide, stannic oxide, iron oxide, zinc oxide, zirconium oxide, zinc borate, aluminum hydroxide and ammonium polyphosphate.

17. A flame-retardant styrene resin composition according to claim 16, wherein the content of the flame-retarding aid is 2 to 10 parts by weight per 100 parts by weight of the styrene resin.

* * * * *